(12) United States Patent
Yamamoto et al.

(10) Patent No.: US 10,396,698 B2
(45) Date of Patent: Aug. 27, 2019

(54) DRIVE DEVICE AND DRIVE SYSTEM

(71) Applicant: TOYOTA JIDOSHA KABUSHIKI KAISHA, Toyota-shi, Aichi-ken (JP)

(72) Inventors: Toshihiro Yamamoto, Toyohashi (JP); Kenji Yamada, Komaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/947,963

(22) Filed: Apr. 9, 2018

(65) Prior Publication Data
US 2018/0294761 A1    Oct. 11, 2018

(30) Foreign Application Priority Data
Apr. 10, 2017  (JP) .................. 2017-077312

(51) Int. Cl.
*H02P 6/14*    (2016.01)
*H02P 27/08*   (2006.01)
(Continued)

(52) U.S. Cl.
CPC .......... *H02P 27/085* (2013.01); *B60L 50/51* (2019.02); *H02M 1/12* (2013.01); *H02M 1/44* (2013.01);
(Continued)

(58) Field of Classification Search
CPC ...... H02P 27/085; H02P 6/08; H02M 7/5395; H02M 1/12; B60L 11/1803; B60L 2210/40
(Continued)

(56) References Cited

U.S. PATENT DOCUMENTS

2011/0187308 A1*  8/2011  Suhama .............. H02P 27/04
                                        318/798
2011/0193509 A1*  8/2011  Ooyama ............. H02M 1/12
                                        318/503
(Continued)

FOREIGN PATENT DOCUMENTS

JP   2013-162660 A    8/2013
JP   2014-230472 A    12/2014
JP   2017-200379 A    11/2017

OTHER PUBLICATIONS

U.S. Appl. No. 15/724,520, filed Oct. 4, 2017 Inventors 1. Kiyotaka Matsubara, 2. Kenji Yamada, 3. Toshihiro Yamamoto.
(Continued)

*Primary Examiner* — Eduardo Colon Santana
*Assistant Examiner* — Gabriel Agared
(74) *Attorney, Agent, or Firm* — Sughrue Mion, PLLC

(57) ABSTRACT

First pulse width modulation control is a control of generating a first pulse width modulation signal for a plurality of switching elements by comparison of modulated waves of voltage commands in phases based on a torque command for a motor with a carrier voltage, and performing switching of the plurality of switching elements. Second pulse width modulation control is a control of generating a second pulse width modulation signal for the plurality of switching elements based on a modulation factor of a voltage and a voltage phase based on the torque command and the number of pulses per unit period of an electrical angle of the motor, and performing switching of the plurality of switching elements. An electronic control unit is configured to switch the plurality of switching elements between the first pulse width modulation control and the second pulse width modulation control at irregular time intervals.

7 Claims, 5 Drawing Sheets

(51) Int. Cl.
  *H02P 6/08* (2016.01)
  *H02M 7/5395* (2006.01)
  *H02M 1/12* (2006.01)
  *H02M 1/44* (2007.01)
  *B60L 50/51* (2019.01)
  *H02M 1/00* (2006.01)

(52) U.S. Cl.
  CPC ............ *H02M 7/5395* (2013.01); *H02P 6/08* (2013.01); *B60L 2210/40* (2013.01); *H02M 2001/007* (2013.01); *H02P 2201/07* (2013.01); *Y02T 10/642* (2013.01); *Y02T 10/7005* (2013.01); *Y02T 10/7225* (2013.01); *Y02T 10/7241* (2013.01)

(58) Field of Classification Search
  USPC ...................................................... 318/400.26
  See application file for complete search history.

(56) References Cited

U.S. PATENT DOCUMENTS

| | | | |
|---|---|---|---|
| 2011/0266992 A1* | 11/2011 | Nishiguchi | B60L 11/123 318/807 |
| 2011/0273125 A1* | 11/2011 | Yamada | H02P 21/0003 318/503 |
| 2012/0056569 A1* | 3/2012 | Takamatsu | H02P 27/08 318/400.26 |
| 2013/0200830 A1* | 8/2013 | Suzuki | H02P 6/14 318/400.27 |
| 2016/0111951 A1 | 4/2016 | Taniguchi et al. | |
| 2017/0317620 A1 | 11/2017 | Yamamoto et al. | |

OTHER PUBLICATIONS

U.S. Appl. No. 15/816,411, filed Nov. 17, 2017 Inventors: 1. Masashi Mizuno, 2. Toshihiro Yamamoto, 3. Kenji Yamada.

* cited by examiner

| NUMBER k | DURATION TIME THRESHOLD VALUE Cref |
|---|---|
| 1 | 60 |
| 2 | 5 |
| 3 | 6 |
| 4 | 45 |
| 5 | 23 |
| . | . |
| . | . |
| . | . |

DRIVE DEVICE AND DRIVE SYSTEM

INCORPORATION BY REFERENCE

The disclosure of Japanese Patent Application No. 2017-077312 filed on Apr. 10, 2017 including the specification, drawings and abstract is incorporated herein by reference in its entirety.

BACKGROUND

1. Technical Field

The disclosure relates to a drive device and a drive system, and more particularly to a drive device and a drive system that include a motor and an inverter.

2. Description of Related Art

In the related art, a type of drive device which includes an electric motor and a power conversion device having an inverter circuit that drives the electric motor by switching a plurality of switching elements and which generates pulse signals of the plurality of switching elements based on the number of pulses in one electrical period of the electric motor and a modulation factor of a voltage and a voltage phase based on a torque command for the electric motor to switch the plurality of switching elements has been proposed (for example, see Japanese Unexamined Patent Application Publication No. 2013-162660 (JP 2013-162660 A). In such a drive device, reduction of a total power loss of the power conversion device and the electric motor is achieved by generating pulse signals to minimize the total power loss of the power conversion device and the electric motor based on the number of pulses, the modulation factor, and the voltage phase.

SUMMARY

In the drive device, change of contained current harmonics (a frequency (an order) having a large content by percentage in current harmonics) may be small and noise due to electromagnetic sound may become large. Particularly, when an electric motor is driven normally (when the number of pulses, the modulation factor, and the voltage phase are substantially constant), noise due to electromagnetic sound is likely to become large.

A drive device and a drive system according to the disclosure reduce noise due to electromagnetic sound.

The drive device and the drive system according to the disclosure employ the following configurations.

An example aspect of the present disclosure is a drive device includes: a motor; an inverter configured to drive the motor by switching a plurality of switching elements; and an electronic control unit configured to switch the plurality of switching elements between first pulse width modulation control (first PWM control) and second pulse width modulation control (second PWM control). The first PWM control is a control of generating a first pulse width modulation signal (first PWM signal) for the plurality of switching elements by comparison of modulated waves of voltage commands in phases based on a torque command for the motor with a carrier voltage, and performing switching of the plurality of switching elements, the second PWM control is a control of generating a second pulse width modulation signal (second PWM signal) for the plurality of switching elements based on a modulation factor of a voltage and a voltage phase based on the torque command and the number of pulses per unit period of an electrical angle of the motor, and performing switching of the plurality of switching elements. The electronic control unit is configured to switch the plurality of switching elements between the first PWM control and the second PWM control at irregular time intervals. An example aspect of the present disclosure is a control method of a drive device. The drive device includes a motor, an inverter that drives the motor by switching a plurality of switching elements, and an electronic control unit. The control method includes: switching, by the electronic control unit, the plurality of switching elements between first PWM control and second PWM control; switching, by the electronic control unit, the plurality of switching elements between the first PWM control and the second PWM control at irregular time intervals. The first PWM control is a control of generating a first PWM signal for the plurality of switching elements by comparison of modulated waves of voltage commands in phases based on a torque command for the motor with a carrier voltage, and performing switching of the plurality of switching elements, the second PWM control is a control of generating a second PWM signal for the plurality of switching elements based on a modulation factor of a voltage and a voltage phase based on the torque command and the number of pulses per unit period of an electrical angle of the motor, and performing switching of the plurality of switching elements.

In the drive device according to the disclosure, the first PWM control of generating a first PWM signal for the plurality of switching elements by comparison of modulated waves of voltage commands in phases based on a torque command for the motor with a carrier voltage and performing switching of the plurality of switching elements and the second PWM control of generating a second PWM signal for the plurality of switching elements based on a modulation factor of a voltage and a voltage phase based on the torque command and the number of pulses per unit period of an electrical angle of the motor and performing switching of the plurality of switching elements are selectively performed. Switching to the first PWM control and the second PWM control is performed at irregular time intervals. By switching the switching elements between the first PWM control and the second PWM control, times at which the plurality of switching elements are turned on and off can be changed, and contained current harmonics (a frequency (an order) having a large content by percentage in current harmonics) can be changed (diffused) at the irregular time intervals. Accordingly, by switching the switching elements between the first PWM control and the second PWM control at irregular time intervals, it is possible to change (diffuse) the contained current harmonics at the irregular time intervals. As a result, it is possible to reduce noise due to electromagnetic sound.

The first PWM control may be synchronous pulse width modulation control, and the electronic control unit may be configured to set a synchronization number of the carrier voltage in the first PWM control and the number of pulses in the second PWM control to the same value. Accordingly, since a predetermined number of pulses can be maintained at the time of switching between the first PWM control and the second PWM control by setting the synchronization number and the number of pulses to the same value, it is possible to maintain predetermined controllability. The electronic control unit may be configured to set the number of pulses such that a total loss of the motor and the inverter when the second PWM control is performed is minimized.

The first PWM control may be synchronous pulse width modulation control, and the electronic control unit may be configured to: switch the plurality of switching elements from the first PWM control to the second PWM control at a time of a zero-crossing of one of the modulated waves of the voltage commands of the phases that are used to generate the first PWM signal for the plurality of switching elements; and switch the plurality of switching elements from the second PWM control to the first PWM control at a time of a zero-crossing time of one of modulated waves of virtual voltage commands of the phases corresponding to the second PWM signal for the plurality of switching elements. According to this configuration, it is possible to curb deterioration of controllability of the motor at the time of switching between the first PWM control and the second PWM control.

The second PWM control may be a control of generating the second PWM signal for the plurality of switching elements such that a total loss of the motor and the inverter is adjusted. The second PWM control may be a control of generating the second PWM signal for the plurality of switching elements such that the total loss is adjusted by adjusting harmonic components of a predetermined order.

The second PWM control may be a control of generating the second PWM signal for the plurality of switching elements such that harmonic components of a predetermined order are adjusted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
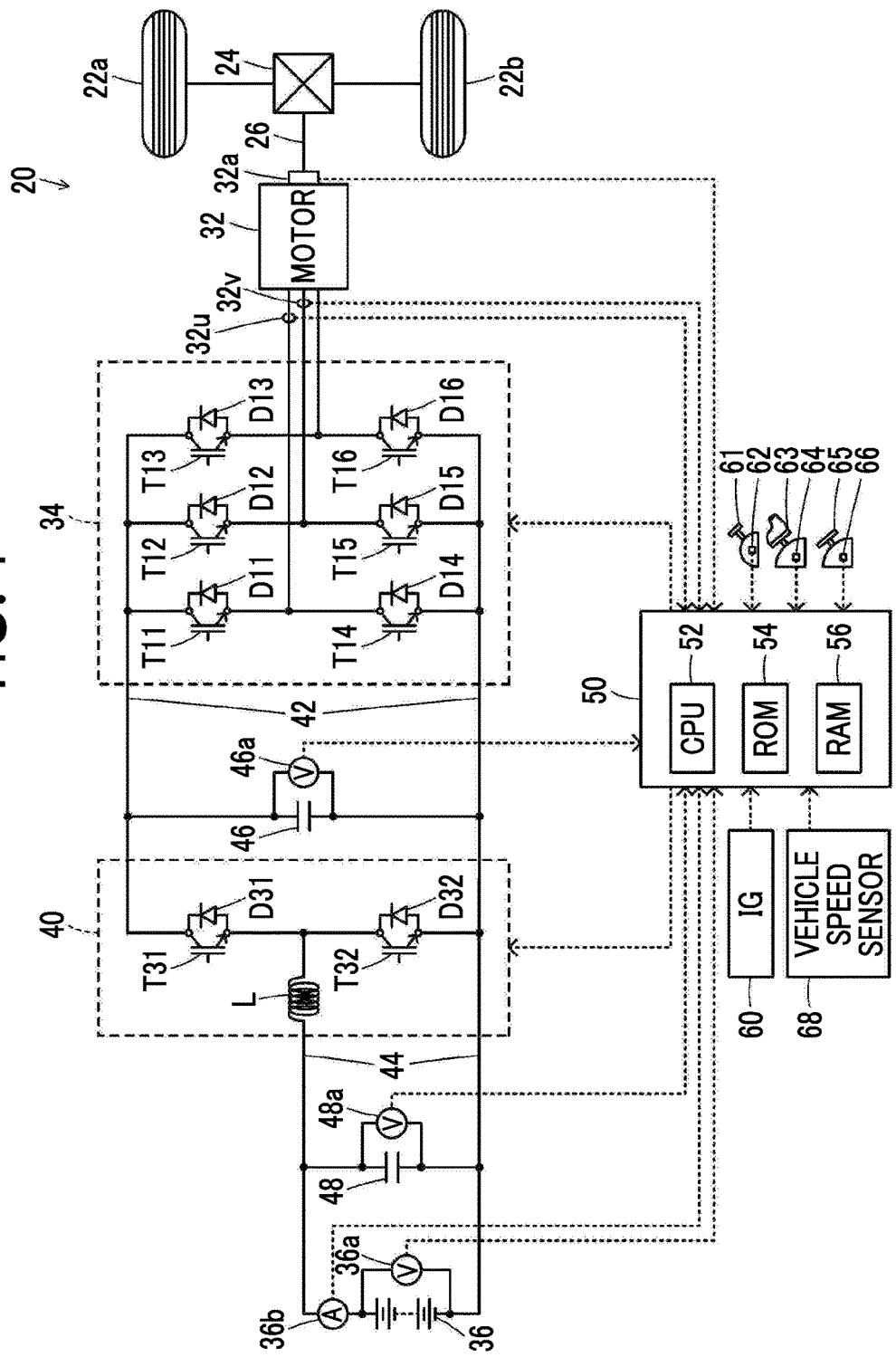
FIG. 1 is a diagram schematically illustrating a configuration of an electric vehicle in which a drive device according to an embodiment of the disclosure is mounted.

FIG. 1 is a diagram schematically illustrating a configuration of an electric vehicle 20 in which a drive device according to an embodiment of the disclosure is mounted. As illustrated in the drawing, the electric vehicle 20 according to the embodiment includes a motor 32, an inverter 34, a battery 36 serving as a power storage device, a boost converter 40, and an electronic control unit 50.

The motor 32 is configured as a synchronous generator motor and includes a rotor that has a permanent magnet embedded therein and a stator on which three-phase coils are wound. The rotor of the motor 32 is connected to a drive shaft 26 connected to driving wheels 22a and 22b via a differential gear 24.

The inverter 34 is used to drive the motor 32. The inverter 34 is connected to the boost converter 40 via power lines 42 on a high voltage side and includes six transistors T11 to T16 and six diodes D11 to D16 that are connected in parallel to the six transistors T11 to T16. The transistors T11 to T16 are arranged in pairs of two transistors to serve as a source side and a sink side with respect to a positive electrode line and a negative electrode line of the power lines 42 on the high voltage side. Each junction between the transistors constituting a pair in the transistors T11 to T16 is connected to the corresponding three-phase coil (a U phase, a V phase, or a W phase) of the motor 32. Accordingly, when a voltage is applied to the inverter 34, an ON-time ratio of the transistors T11 to T16 constituting each pair is adjusted by the electronic control unit 50, whereby a rotating magnetic field is formed in the three-phase coils and the motor 32 is rotationally driven. A smoothing capacitor 46 is attached to the positive electrode line and the negative electrode line of the power lines 42 on the high voltage side.

The battery 36 is configured, for example, as a lithium-ion secondary battery or a nickel-hydride secondary battery and is connected to the boost converter 40 via power lines 44 on a low voltage side. A smoothing capacitor 48 is attached to a positive electrode line and a negative electrode line of the power lines 44 on the low voltage side.

The boost converter 40 is connected to the power lines 42 on the high voltage side and the power lines 44 on the low voltage side and includes two transistors T31 and T32, two diodes D31 and D32 that are connected in parallel to the two transistors T31 and T32, and a reactor L. The transistor T31 is connected to the positive electrode line of the power lines 42 on the high voltage side. The transistor T32 is connected to the transistor T31 and the negative electrode lines of the power lines 42 on the high voltage side and the power lines 44 on the low voltage side. The reactor L is connected to a junction point between the transistors T31 and T32 and the positive electrode line of the power lines 44 on the low voltage side. When an ON-time ratio of the transistors T31 and T32 is adjusted by the electronic control unit 50, the boost converter 40 steps up electric power of the power lines 44 on the low voltage side and supplies the stepped-up power to the power lines 42 on the high voltage side or steps down electric power of the power lines 42 on the high voltage side and supplies the stepped-down power to the power lines 44 on the low voltage side.

The electronic control unit 50 is configured as a microprocessor such as a CPU 52, and includes a ROM 56 that stores a processing program, a RAM 54 that temporarily stores data, and input and output ports in addition to the CPU 52. Signals from various sensors are input to the electronic control unit 50 via the input port. Examples of the signals input to the electronic control unit 50 include a rotational position θm from a rotational position sensor (for example, a resolver) 32a that detects a rotational position of the rotor of the motor 32 and phase currents Iu and Iv from current sensors 32u and 32v that detect currents flowing in phases of the motor 32. Examples thereof further include a voltage Vb from a voltage sensor 36a that is attached between the terminals of the battery 36 and a current Ib from a current sensor 36b that is attached to the output terminal of the battery 36. Examples thereof further include a voltage VH of the capacitor 46 (the power lines 42 on the high voltage side) from a voltage sensor 46a that is attached between the terminals of the capacitor 46 and a voltage VL of the capacitor 48 (the power lines 44 on the low voltage side) from a voltage sensor 48a that is attached between the terminals of the capacitor 48. Examples thereof further include an ignition signal from an ignition switch 60 and a shift position SP from a shift position sensor 62 that detects an operation position of a shift lever 61. Examples thereof further include an accelerator operation amount Acc from an accelerator pedal position sensor 64 that detects an amount of depression of an accelerator pedal 63, a brake pedal position BP from a brake pedal position sensor 66 that detects an amount of depression of a brake pedal 65, and a vehicle speed V from a vehicle speed sensor 68. Various control signals are output from the electronic control unit 50 via the output port. Examples of the signals output from the electronic control unit 50 include switching control signals for the transistors T11 to T16 of the inverter 34 and switching control signals for the transistors T31 and T32 of the boost converter 40. The electronic control unit 50 calculates an electrical angle θe, an angular velocity ωm, and a rotation speed Nm of the motor 32 based on the rotational position θm of the rotor of the motor 32 from the rotational position sensor 32a. The electronic control unit 50 calculates a state of charge SOC of the battery 36 based on an integrated value of the current Ib of the battery 36 from the current sensor 36b. The state of charge SOC refers to a ratio of an electric power capacity which can be discharged from the battery 36 to the total capacity of the battery 36.

In the electric vehicle 20 according to the embodiment having the above-mentioned configuration, the electronic control unit 50 sets a required torque Td* that is required for the drive shaft 26 based on the accelerator operation amount Acc and the vehicle speed V, sets the set required torque Td* as a torque command Tm* for the motor 32, and performs switching control of the transistors T11 to T16 of the inverter 34 such that the motor 32 can be driven in accordance with the torque command Tm*. The electronic control unit 50 sets a target voltage VH* of the power lines 42 on the high voltage side such that the motor 32 can be driven in accordance with the torque command Tm*, and performs switching control of the transistors T31 and T32 of the boost converter 40 such that the voltage VH of the power lines 42 on the high voltage side reaches the target voltage VH*.

Control of the inverter 34 will be described below. In the embodiment, it is assumed that execution control is set from first pulse width modulation (PWM) control and second PWM control and the set execution control is performed as the control of the inverter 34. The first PWM control is control of generating first PWM signals of the transistor T11 to T16 by comparison of a carrier voltage (a triangular voltage) with modulated waves Vu*, Vv*, and Vw* of voltage commands of the phases based on the torque command Tm* for the motor 32 and switching the transistors T11 to T16, and is set to synchronous PWM control out of synchronous PWM control and asynchronous PWM control in the embodiment. The second PWM control is control of generating second PWM signals for the transistors T11 to T16 based on a modulation factor Rm of a voltage and a voltage phase θp based on the torque command Tm* for the motor 32 and the number of pulses Np per unit period (one period in the embodiment) of the electrical angle θe of the motor 32 and switching the transistors T11 to T16. The number of pulses Np corresponds to a synchronization number Ns of the carrier voltage in the first PWM control per unit period (one period in the embodiment) of the electrical angle θe of the motor 32.

In the first PWM control, on the premise that the total sum of the phase currents Iu, Iv, and Iw of the phases (a U phase, a V phase, and a W phase) of the motor 32 is a value of zero, the electronic control unit 50 coordinate-converts (three-two phase conversion) the phase currents Iu and Iv of the U phase and the V phase into currents Id and Iq of a d axis and a q axis using the electrical angle θe of the motor 32 and sets current commands Id* and Iq* of the d axis and the q axis based on the torque command Tm* for the motor 32. Subsequently, the electronic control unit 50 sets voltage commands Vd* and Vq* of the d axis and the q axis using the current commands Id* and Iq* and the currents Id and Iq of the d axis and the q axis. The electronic control unit 50 coordinate-converts (two-three phase conversion) the voltage commands Vd* and Vq* of the d axis and the q axis into modulated waves Vu*, Vv*, and Vw* of the voltage commands of the phases using the electrical angle θe of the motor 32, and generates first PWM signals for the transistors T11 to T16 by comparing the carrier voltage with the modulated waves Vu*, Vv*, and Vw* of the voltage commands of the phases. Then, the electronic control unit 50 performs switching of the transistors T11 to T16 using the first PWM signals for the transistors T11 to T16.

In the second PWM control, similarly to the first PWM control, the electronic control unit 50 sets the voltage commands Vd* and Vq* of the d axis and the q axis and sets the modulation factor Rm and the voltage phase θp based on the voltage commands Vd* and Vq* of the d axis and the q axis. The modulation factor Rm can be acquired by dividing a square root of a sum of a square of the voltage command Vd* of the d axis and a square of the voltage command Vq* of the q axis by the voltage VH of the power lines 42 on the high voltage side. The voltage phase θp can be acquired as an angle of a vector having the voltage commands Vd* and Vq* of the d axis and the q axis as components with respect to the q axis. Subsequently, the electronic control unit 50 sets a switching electrical angle θsw and a switching pattern Psw based on the modulation factor Rm, the voltage phase θp, and the number of pulses Np, and generates the second PWM signals for the transistors T11 to T16 based on the switching electrical angle θsw and the switching pattern Psw. The switching electrical angle θsw is an electrical angle θe by which ON and OFF of the transistors of one phase of the phases of the motor 32 (for example, the transistors T11 and T14 of the U phase) are switched. The switching pattern Psw is a pattern indicating a combination of ON and OFF of the transistors T11 to T16, and the following patterns Psw0 to Psw7 are used. The number of switching electrical angles θsw and the number of switching patterns Psw correspond to Nsw (=number of pulses Np×two times×three phases) per unit period of the electrical angle θe of the motor 32. "×two times" means that double the number of pulses Np is required for rising (from OFF to ON) and falling (from ON to OFF) of each pulse. "×three phases" means that three times a single phase is required because the motor 32 is a three-phase motor. When the second PWM signals for the transistors T11 to T16 are generated in this way, switching of the transistors T11 to T16 is performed using the second PWM signals for the transistors T11 to T16. Psw0: all the transistors T11 to T13 are turned off and all the transistors T14 to T16 are turned on. Psw1: the transistors T11, T12, and T16 are turned off and the transistors T13, T14, and T15 are turned on. Psw2: the transistors T11, T13, and T15 are turned off and the transistors T12, T14, and T16 are turned on. Psw3: the transistors T11, T15, and T16 are turned off and the transistors T12, T13, and T14 are turned on. Psw4: the transistors T11, T15, and T16 are turned on and the transistors T12, T13, and T14 are turned off. Psw5: the transistors T11, T13, and T15 are turned on and the transistors T12, T14, and T16 are turned off. Psw6: the transistors T11, T12, and T16 are turned on and the transistors T13, T14, and T15 are turned off. Psw7: all the transistors T11 to T13 are turned on and all transistors T14 to T16 are turned off.

The synchronization number Ns of the first PWM control and the number of pulses Np of the second PWM control will be described below. In the embodiment, it is assumed that the synchronization number Ns is set based on the rotation speed Nm of the motor 32 and the synchronization number Ns is set as the number of pulses Np. As the synchronization number Ns or the number of pulses Np increases, controllability of the motor 32 is improved and the loss Lm of the motor 32 decreases, but the number of switching operations of the transistors T11 to T16 increases and the loss Li of the inverter 34 increases. On the basis thereof, in the embodiment, the synchronization number Ns (the number of pulses Np) at which the total loss Lsum of the loss Lm of the motor 32 and the loss Li of the inverter 34 is as small as possible within a range in which controllability of the motor 32 can be secured to a certain extent is set. By setting the synchronization number Ns and the number of pulses Np to the same value, a predetermined number of pulses can be maintained and controllability of the motor 32 can be maintained during switching between the first PWM control and the second PWM control.

A method of generating a second PWM signal (a set of Nsw switching electrical angles θsw[i] (i: 1 to Nsw) and switching patterns Psw[i] per unit period of the electrical angle θe of the motor 32) in the second PWM control will be described below. In the embodiment, a plurality of candidates for the second PWM signal are generated such that conditions of the modulation factor Rm and the voltage phase θp are satisfied, and the second PWM signal is selected and generated from the plurality of candidates for the second PWM signal based on the number of pulses Np. Hereinafter, details of the process of selecting and generating the second PWM signal from a plurality of candidates for the second PWM signal will be described.

When a constraint condition that the second PWM signal be generated (selected from a plurality of candidates for the second PWM signal) such that half wave symmetry expressed by "f(ωm·t)=−f(ωm·t+π)" is exhibited is used, where "ωm" denotes the angular velocity of the rotor of the motor 32 and "t" denotes time, the second PWM signal f(θe), where θe denotes the electrical angle of the motor 32, can be expressed by Equation (1) using the Fourier series expansion. It is possible to achieve deletion of even-ordered harmonic components or simplification of control by using these constraint conditions. In Equation (1), "n" denotes the order of a harmonic component which is 1, 3, 5, 7, . . . (an odd integer) and "M" denotes the number of switching operations (from which switching at a reference electrical angle (for example, 0° or 180°) is excluded) of a transistor per half period of the electrical angle θe of the motor 32. The number of switching operations M is expressed by "M=Np−1," where "Np" denotes the number of pulses per unit period (one period in the embodiment) of the electrical angle θe of the motor 32. In Equation (1), "θsw[m]" denotes an m-th (m: 1 to M) switching electrical angle of a transistor, "an" denotes a Fourier cosine coefficient, "bn" denotes a Fourier sine coefficient, and "a0" denotes a DC component. The amplitude Cn of the harmonic component of each order and the phase αn of the harmonic component of each order can be expressed by Equation (2) from the Fourier cosine coefficient an and the Fourier sine coefficient bn in Equation (1).

$$f(\theta_e) = \frac{a_0}{2} + \sum_{n=1}^{\infty}(a_n\cos n\theta_e + b_n\sin n\theta_e) \quad (1)$$

$$a_n = \frac{1}{\pi}\int_0^{2\pi} f(\theta_e)\cos n\theta_e d\theta_e = -\frac{2}{n\pi}\sum_{m=1}^{M}(-1)^m\sin n\theta_{sw}[m]$$

$$b_n = \frac{1}{\pi}\int_0^{2\pi} f(\theta_e)\sin n\theta_e d\theta_e = \frac{2}{n\pi}\left\{\left(\sum_{m=1}^{M}(-1)^m\cos n\theta_{sw}[m]\right)+1\right\}$$

$$C_n = \sqrt{a_n^2 + b_n^2} \quad (2)$$

$$\alpha_n = \tan^{-1}\frac{b_n}{a_n}$$

A constraint condition that the second PWM signal be generated (selected from a plurality of candidates for the second PWM signal) to have odd symmetry expressed by "f(ωm·t)=f(π−ωm·t)" may be used in addition to the half wave symmetry. It is possible to delete cosine components of harmonics by using this constraint condition. In this case, "n" denotes 1, 5, 7, 11, . . . (an odd integer that is not a multiple of 3) and "M" denotes the number of switching operations (from which switching at a reference electrical angle is excluded) of a transistor per quarter period of the electrical angle θe of the motor 32, whereby "M=(Np−1)/2" is established.

In the embodiment, a method of reducing the sum of harmonic components of the orders is considered as the method of generating the second PWM signal (selecting the second PWM signal from a plurality of candidates for the second PWM signal). A core loss Wi in the loss Lm of the motor 32 can be expressed by Equation (3) from Steinmetz's experimental formula. In Equation (3), "Wh" denotes a hysteresis loss, "We" denotes an eddy current loss, "Kh" denotes a hysteresis loss factor, "Bm" denotes a magnetic flux density, "fm" denotes a rotating magnetic flux frequency of the motor 32, and "Ke" denotes an eddy current loss factor.

$$W_i = W_h + W_c = K_h B_m^2 f_m + K_e B_m^2 f_m^2 \quad (3)$$

When attention is paid to the eddy current loss We having a high ratio in the total core loss Wi of the motor 32 and a phase potential of the motor 32 is defined as "Vm," the magnetic flux density Bm and a value (Vm/fm) obtained by dividing the phase potential Vm of the motor 32 by the rotating magnetic flux frequency fm generally have a proportional relationship and thus Equation (4) can be derived. In Equation (4), when the eddy current loss factor Ke (a constant) is ignored, the rotating magnetic flux frequency fm of the order n is replaced with the order n, the phase potential of the motor 32 of the order n is defined as "Vmn," and a maximum order which is considered to decrease or increase a loss is "N" (for example, the 107th order), the sum of the harmonic components of the orders can be expressed by Equation (5). When it is intended to decrease the loss Lm of the motor 32, the value of Equation (5) can be decreased. The phase potential Vmn of the motor 32 of the order n refers to the amplitude Cn of the harmonic component of the order n and thus the value of Equation (6) can be decreased.

$$W_e \propto \frac{K_e V_m^2}{f_m} \quad (4)$$

$$\sum_{n=1}^{N} \frac{V_{mn}^2}{n} \quad (5)$$

$$\sum_{n=1}^{N} \frac{C_n^2}{n} \quad (6)$$

When the second PWM signal f(θe) is set from a plurality of candidates for the second PWM signal expressed by Equation (1) to decrease the value of Equation (6), it is possible to decrease the sum of the harmonic components of the orders and to decrease the loss Lm of the motor 32. Preferably, the second PWM signal f(θe) in Equation (1) is set from a plurality of candidates for the second PWM signal to minimize the value of Equation (6). In Equation (1), a value zero is set as "a1" to set a one-dimensional fundamental wave phase to 0°.

In consideration of the above description, a plurality of candidates for the second PWM signal (a set of Nsw switching electrical angles θsw[i] (i: 1 to Nsw) and switching patterns Psw[i] per unit period of the electrical angle θe of the motor 32) are generated by calculation or using a map based on the modulation factor Rm and the voltage phase θp, and the second PWM signal is selected and generated from the plurality of candidates for the second PWM signal based on the number of pulses Np. Instead of this method, a method of directly generating the second PWM signal by applying the modulation factor Rm, the voltage phase θp, and the number of pulses Np to one map in which a relationship between the modulation factor Rm, the voltage phase θp, the number of pulses Np, and the second PWM signal is defined may be employed.

Figure 2:
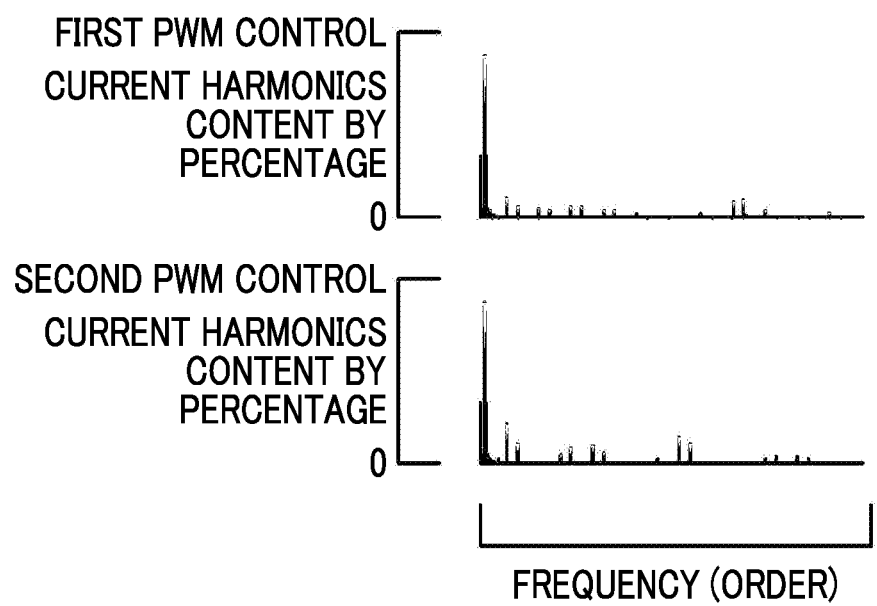
FIG. 2 is a diagram illustrating an example of contents by percentage of frequencies (orders) of current harmonics when first PWM control is performed and when second PWM control is performed when a torque command Tm* for a motor has a given value.

FIG. 2 is a diagram illustrating an example of content by percentage of frequencies (orders) of current harmonics on the occasion of performing the first PWM control and on the occasion of performing the second PWM control when the torque command Tm* for the motor 32 has a given value. The upper part of FIG. 2 illustrates the case in which the first PWM control is performed and the lower part of FIG. 2 illustrates the case in which the second PWM control is performed. As can be seen from the upper part of FIG. 2 and the lower part of FIG. 2, contained current harmonics (a frequency (an order) having a large content by percentage in current harmonics) are different between when the first PWM control is performed and when the second PWM control is performed. This is because the waveform of the first PWM signal in the first PWM control and the waveform of the second PWM signal in the second PWM control are different and the times at which the transistors T11 to T16 are turned on and off are different.

Figure 3:
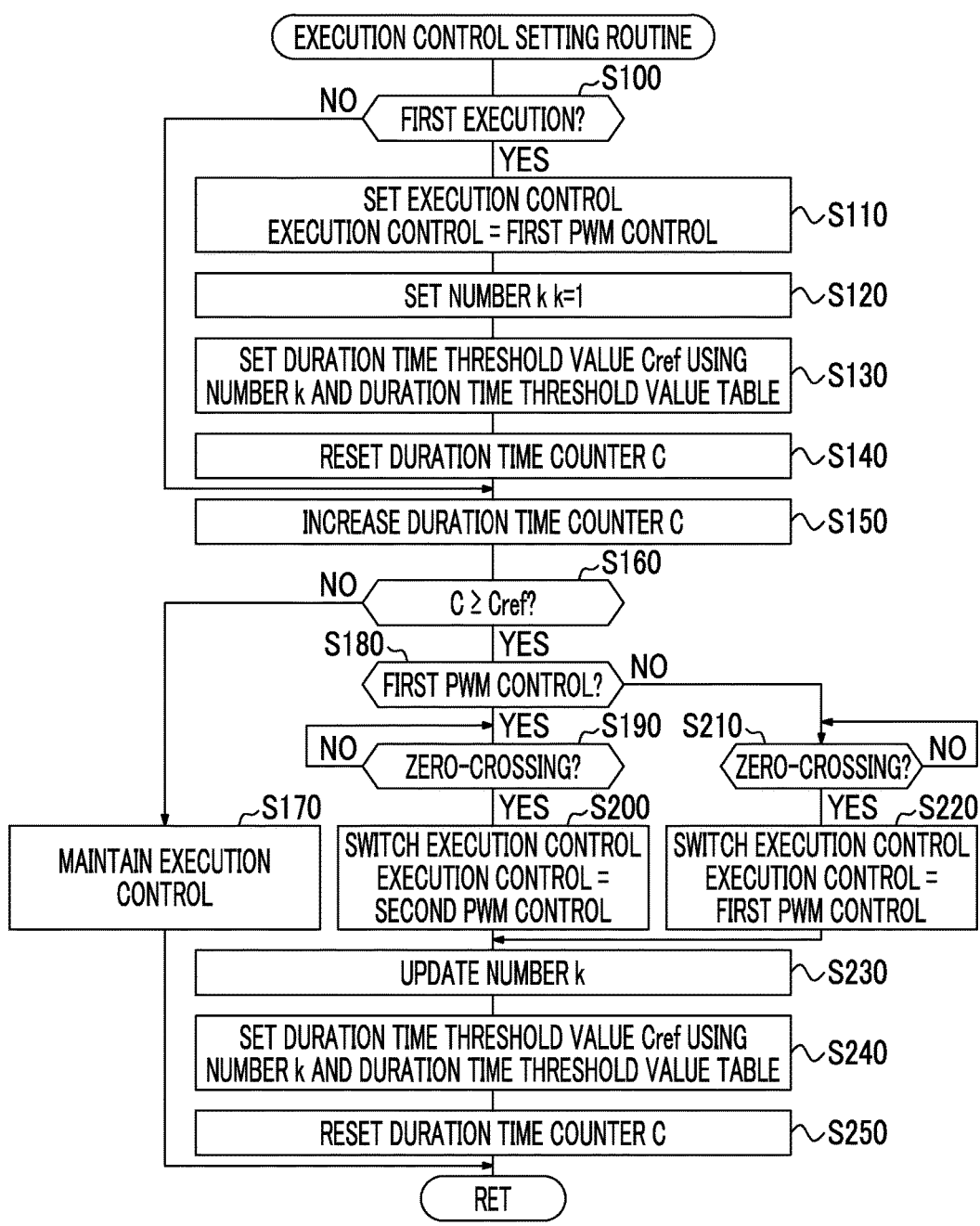
FIG. 3 is a flowchart illustrating an example of an execution control setting routine which is performed by an electronic control unit.

The operation of the electric vehicle 20 according to the embodiment having the above-mentioned configuration, particularly, the operation when execution control of the inverter 34 is set to one of the first PWM control and the second PWM control, will be described below. FIG. 3 is a flowchart illustrating an example of an execution control setting routine which is performed by the electronic control unit 50. This routine is repeatedly performed.

When the execution control setting routine illustrated in FIG. 3 is performed, the CPU 52 of the electronic control unit 50 determines whether the routine is first performed in a current trip (from ignition ON to ignition OFF) (Step S100), and sets the first PWM control as the execution control when it is determined that the routine is first performed in the current trip (Step S110).

Figures 4, 5:
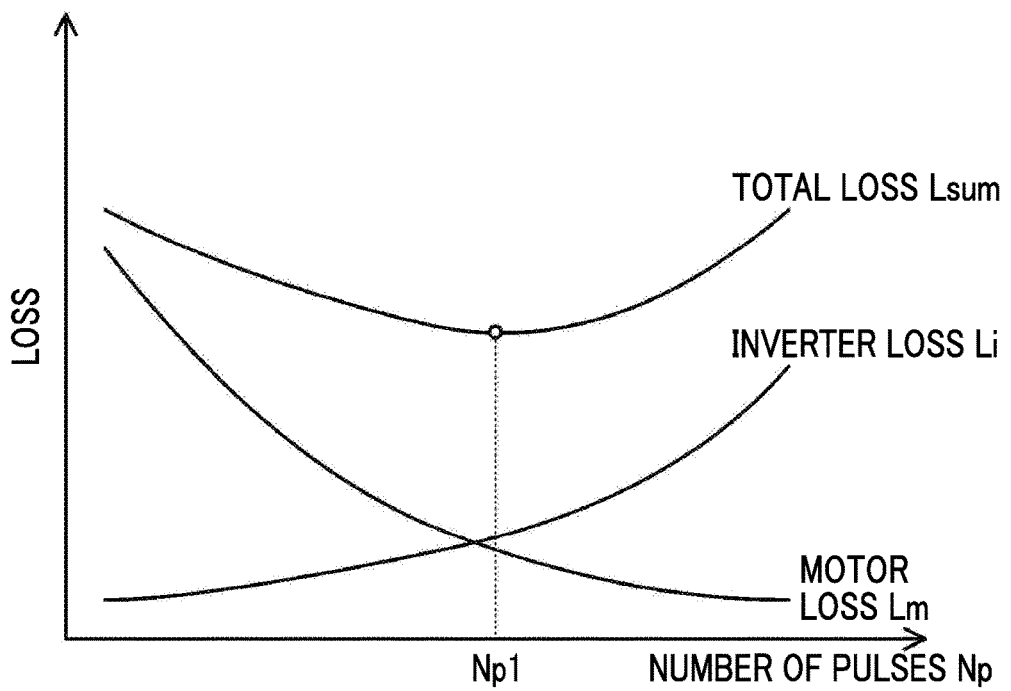
FIG. 4 is a diagram illustrating an example of a duration time threshold value table.
FIG. 5 is a diagram illustrating an example of a relationship between the number of pulses Np, a loss Lm of a motor, a loss Li of an inverter, and a total loss Lsum when second PWM control is performed.

Subsequently, a value 1 is set as an initial value of the number k (Step S120), a duration time threshold value Cref is set using the number k and a duration time threshold value table (Step S130), and a duration time counter C is reset to a value 0 (Step S140). Here, the duration time threshold value Cref is a counter value corresponding to the time in which the execution control continues to be performed in the first PWM control or the second PWM control. The duration time threshold value table is a table indicating a relationship between the number k and the duration time threshold value Cref. An example of the duration time threshold value table is illustrated in FIG. 4. As illustrated in the drawing, the duration time threshold value Cref is set to vary irregularly whenever the number k is increased by a value 1. The duration time threshold value Cref can be set by applying the number k to the duration time threshold value table. The duration time counter C is a counter value corresponding to the time elapsing after the execution control is set at the time of first performing of the routine or after being switched thereafter. When it is determined in Step S100 that the routine is not first performed in the current trip, the processes of Steps S110 to S140 are not performed.

Then, the duration time counter C is increased by a value 1 (Step S150), the duration time counter C is compared with the duration time threshold value Cref (Step S160), the execution control is maintained when the duration time counter C is less than the duration time threshold value Cref (Step S170), and then a flag setting process ends.

When it is determined in Step S160 that the duration time counter C is equal to or greater than the duration time threshold value Cref, it is determined whether the current execution control is the first PWM control or the second PWM control (Step S180). Then, when the current execution control is the first PWM control, the execution control is switched to the second PWM control at a time of a zero-crossing of one of the modulated waves Vu*, Vv*, and Vw* of the voltage commands of the phases which are used to generate the first PWM signal for the transistors T11 to T16 (Steps S190 and S200). On the other hand, when the current execution control is the second PWM control, the execution control is switched to the first PWM control at a time of a zero-crossing of one of the modulated waves of virtual voltage commands of the phases corresponding to the second PWM signal for the transistors T11 to T16 (Steps S210 and S220). In the second PWM control, since the second PWM signal is directly generated based on the modulation factor Rm, the voltage phase θp, and the number of pulses Np and the modulated waves Vu*, Vv*, and Vw* of the voltage commands of the phases are not used unlike the first PWM control, the modulated waves of the virtual voltage commands of the phases are considered to correspond to the modulated waves Vu*, Vv*, and Vw* of the voltage commands of the phases. The time of a zero-crossing of one of the modulated waves of the virtual voltage commands of the phases can be acquired as a modulated wave of a voltage command which is considered to be necessary when it is assumed that an instantaneous average voltage (a fundamental wave) of actual outputs of the phases by the second PWM control is output by the first PWM control.

In this way, by performing the switching at the time of a zero-crossing of one of the modulated waves Vu*, Vv*, and Vw* of the voltage commands of the phases which are used to generate the first PWM signal for the transistors T11 to T16 when the execution control is switched from the first PWM control to the second PWM control and performing the switching at the time of a zero-crossing of one of the modulated waves of the virtual voltage commands of the phases corresponding to the second PWM signal for the transistors T11 to T16 when the execution control is switched from the second PWM control to the first PWM control, it is possible to reduce deterioration of controllability of the motor 32 at the time of switching between the first PWM control and the second PWM control. In order to smoothly perform switching between the first PWM control and the second PWM control (switching between the first PWM signal and the second PWM signal), for example, it is conceivable that the first PWM signal and the second PWM signal will be normally generated regardless of whether the execution control is the first PWM control or the second PWM control. When the duration time counter C is equal to or greater than a threshold value Cref2 (=Cref-α) which is slightly less than the duration time threshold value Cref, it can also be conceivable that generation of the second PWM signal will be started when the current execution control is the first PWM control and generation of the first PWM signal will be started when the current execution control is the second PWM control.

Then, the number k is increased and updated by a value 1 (Step S230), the duration time threshold value Cref is set using the number k and the duration time threshold value table (see FIG. 4) (Step S240) similarly to the processes of Steps S130 and S140, the duration time counter C is reset to a value 0 (Step S250), and then the routine ends.

By repeatedly performing the routine, the execution control is switched at the time intervals of the duration time threshold value Cref which varies irregularly. As described above, the first PWM control and the second PWM control are different from each other in the times at which the transistors T11 to T16 are turned on and off and in contained current harmonics (a frequency (an order) having a large content by percentage in current harmonics). Accordingly, by switching the execution control at the time intervals of the duration time threshold value Cref which varies irregularly, it is possible to change (diffuse) the contained current harmonics at the irregular time intervals and to reduce noise due to electromagnetic sound.

In the drive device which is mounted in the electric vehicle 20 according to the embodiment, the execution control of the inverter 34 is switched between the first PWM control and the second PWM control at the irregular time intervals. Accordingly, it is possible to change (diffuse) the contained current harmonics (a frequency (an order) having a large content by percentage in current harmonics) at the irregular time intervals. As a result, it is possible to reduce noise due to electromagnetic sound.

In the drive device which is mounted in the electric vehicle 20 according to the embodiment, the second PWM signal for the transistors T11 to T16 in the second PWM control is generated such that the total loss Lsum of the motor 32 and the inverter 34 is decreased (for example, minimized) by decreasing (for example, minimizing) a harmonic component of a predetermined order. However, the second PWM signal may be generated such that the total loss of the motor 32 and the inverter 34 is increased (for example, maximized) by increasing (for example, maximizing) the harmonic component of the predetermined order.

In the drive device which is mounted in the electric vehicle 20 according to the embodiment, the second PWM signal for the transistors T11 to T16 in the second PWM control is generated such that the total loss Lsum of the motor 32 and the inverter 34 is decreased by decreasing the harmonic component of the predetermined order. However, the second PWM signal may be generated such that the harmonic component of a predetermined order is decreased regardless of whether the total loss Lsum of the motor 32 and the inverter 34 is increased or decreased, or may be generated such that the total loss Lsum of the motor 32 and the inverter 34 is decreased regardless of whether the harmonic component of the predetermined order is increased or decreased.

In the drive device which is mounted in the electric vehicle 20 according to the embodiment, regarding the synchronization number Ns in the first PWM control and the number of pulses Np in the second PWM control, the synchronization number Ns is set based on the rotation speed Nm of the motor 32 and the synchronization number Ns is set as the number of pulses Np. However, the number of pulses Np may be set based on an operating point (the rotation speed Nm and the torque command Tm*) of the motor 32 and the number of pulses Np may be set as the synchronization number Ns. In this case, the number of pulses Np may be set such that the total loss Lsum of the motor 32 and the inverter 34 is minimized. FIG. 5 is a diagram illustrating an example of a relationship between the number of pulses Np, the loss Lm of the motor 32, the loss Li of the inverter 34 (the switching loss), and the total loss Lsum (=Lm+Li) when the second PWM control is performed. This relationship varies depending on the operating point of the motor 32. As can be seen from FIG. 5, the loss Li of the inverter 34 increases as the number of pulses Np increases, and the loss Lm of the motor 32 increases as the number of pulses Np decreases. The former is because the number of switching operations of the transistors T11 to T16 increases as the number of pulses Np increase, and the latter is because a ripple current of the motor 32 increases as the number of pulses Np decreases. In FIG. 5, a value Np1 with which the total loss Lsum when the second PWM control is performed is minimized can be set as the number of pulses Np.

Figure 6:
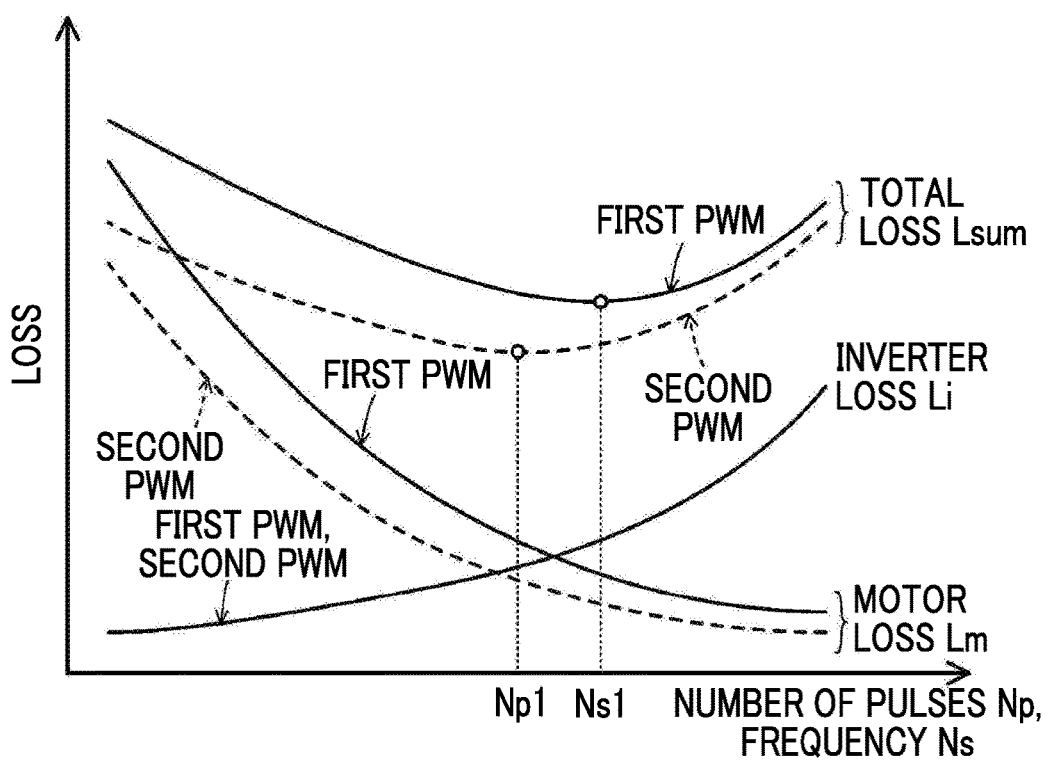
FIG. 6 is a diagram illustrating an example of a relationship between the number of pulses Np, the loss Lm of the motor, the loss Li of the inverter, and the total loss Lsum when first PWM control is performed.

In this modified example, the number of pulses Np is set such that the total loss Lsum is minimized based on the operating point (the rotation speed Nm and the torque command Tm*) of the motor 32, and the number of pulses Np is set as the synchronization number Ns. However, the synchronization number Ns may be set such that the total loss Lsum when the first PWM control is performed is minimized based on the operating point of the motor 32 and the synchronization number Ns may be set as the number of pulses Np. FIG. 6 is a diagram illustrating an example of a relationship between the synchronization number Ns, the loss Lm of the motor 32, the loss Li of the inverter 34, and the total loss Lsum when the first PWM control is performed. This relationship varies depending on the operating point of the motor 32. In FIG. 6, a relationship (the same relationship as illustrated in FIG. 5) between the number of pulses Np, the loss Lm of the motor 32, the loss Li of the inverter 34, and the total loss Lsum when the second PWM control is performed is also described by a dotted line. The loss Li of the inverter 34 is the same in the first PWM control and the second PWM control. In FIG. 6, a value Ns1 with which the total loss Lsum when the first PWM control is performed is minimized can be set as the synchronization number Ns.

Instead thereof (FIG. 5 or 6), the synchronization number Ns and the number of pulses Np may be set to the same value, for example, such that the sum of the total loss Lsum when the first PWM control is performed and the total loss Lsum when the second PWM control is performed is minimized.

In the drive device which is mounted in the electric vehicle 20 according to the embodiment, the synchronization number Ns of the carrier voltage in the first PWM control and the number of pulses Np in the second PWM control are set to the same value, but the synchronization number Ns and the number of pulses Np may be set to different values. For example, the synchronization number Ns may be set to the above-mentioned value Ns1 (see FIG. 6) and the number of pulses Np may be set to the above-mentioned value Np1 (see FIG. 5).

In the drive device which is mounted in the electric vehicle 20 according to the embodiment, the first PWM control is set to synchronous PWM control out of synchronous PWM control and asynchronous PWM control, but may be set to the asynchronous PWM control.

In the drive device which is mounted in the electric vehicle 20 according to the embodiment, when the execution control is switched from the first PWM control to the second PWM control, the switching is performed at the time of a zero-crossing of one of the modulated waves Vu*, Vv*, and Vw* of the voltage commands of the phases which are used to generate the first PWM signal for the transistors T11 to T16, but the switching may be performed regardless of the time. In the embodiment, when the execution control is switched from the second PWM control to the first PWM control, the switching is performed at the time of a zero-crossing of one of the modulated waves of the virtual voltage commands of the phases corresponding to the second PWM signal for the transistors T11 to T16, but the switching may be performed regardless of the time.

In the drive device which is mounted in the electric vehicle 20 according to the embodiment, the battery 36 is used as the power storage device, but a capacitor may be used instead of the battery 36.

In the drive device which is mounted in the electric vehicle 20 according to the embodiment, the boost converter 40 is provided between the battery 36 and the inverter 34, but the boost converter 40 may not be provided.

In the embodiment, a configuration in which the drive device is mounted in the electric vehicle 20 is employed. However, as long as it includes a motor, an inverter, and a power storage device, a configuration in which the drive device is mounted in a hybrid vehicle or a configuration in which the drive device is mounted in equipment which does not move such as construction equipment may be employed.

Correspondence between principal elements of the embodiment and principal elements of the disclosure described in the SUMMARY will be described below. In the embodiment, the motor 32 corresponds to the "motor," the inverter 34 corresponds to the "inverter," and the electronic control unit 50 corresponds to the "controller."

The correspondence between the principal elements of the embodiment and the principal elements of the disclosure described in the SUMMARY does not limit the elements of the disclosure described in the SUMMARY, because the embodiment is an example for specifically describing an aspect of the disclosure described in the SUMMARY. That is, it should be noticed that the disclosure described in the SUMMARY has to be analyzed based on description of the SUMMARY and the embodiment is only a specific example of the disclosure described in the SUMMARY.

While aspects of the disclosure have been described above with reference to the embodiment, the embodiment is only a specific example of the disclosure. The disclosure is not limited to the embodiment, and can be modified in various forms without departing from the gist of the disclosure.

The disclosure is applicable to the industry of manufacturing drive devices.

What is claimed is:

1. A drive device comprising:
a motor;
an inverter configured to drive the motor by switching a plurality of switching elements; and
an electronic control unit configured to switch the plurality of switching elements between a first pulse width modulation control and a second pulse width modulation control,
the first pulse width modulation control being a control of generating a first pulse width modulation signal for the plurality of switching elements by a comparison of modulated waves of voltage commands in phases based on a torque command for the motor with a carrier voltage, and performing switching of the plurality of switching elements,
the second pulse width modulation control being a control of generating a second pulse width modulation signal for the plurality of switching elements based on a modulation factor of a voltage and a voltage phase based on the torque command and the number of pulses per unit period of an electrical angle of the motor, and performing switching of the plurality of switching elements, and
the electronic control unit being configured to switch the plurality of switching elements between the first pulse width modulation control and the second pulse width modulation control at irregular time intervals, wherein
the first pulse width modulation control is a synchronous pulse width modulation control, and
the electronic control unit is configured to:
switch the plurality of switching elements from the first pulse width modulation control to the second pulse width modulation control at a time of a zero-crossing of one of the modulated waves of the voltage commands of the phases that are used to generate the first pulse width modulation signal for the plurality of switching elements; and
switch the plurality of switching elements from the second pulse width modulation control to the first pulse width modulation control at a time of a zero-crossing time of one of modulated waves of virtual voltage commands of the phases corresponding to the second pulse width modulation signal for the plurality of switching elements.

2. The drive device according to claim 1, wherein the electronic control unit is configured to set a synchronization number of the carrier voltage in the first pulse width modulation control and the number of pulses in the second pulse width modulation control to the same value.

3. The drive device according to claim 2, wherein the electronic control unit is configured to set the number of pulses such that a total loss of the motor and the inverter when the second pulse width modulation control is performed is minimized.

4. The drive device according to claim 1, wherein the second pulse width modulation control is a control of generating the second pulse width modulation signal for the plurality of switching elements such that a total loss of the motor and the inverter is adjusted.

5. The drive device according to claim 4, wherein the second pulse width modulation control is a control of generating the second pulse width modulation signal for the plurality of switching elements such that the total loss is adjusted by adjusting harmonic components of a predetermined order.

6. The drive device according to claim 1, wherein the second pulse width modulation control is a control of generating the second pulse width modulation signal for the plurality of switching elements such that harmonic components of a predetermined order are adjusted.

7. A control method of a drive device,
the drive device including a motor, an inverter that drives the motor by switching a plurality of switching elements, and an electronic control unit,
the control method comprising:
switching, by the electronic control unit, the plurality of switching elements between a first pulse width modulation control and a second pulse width modulation control,
the first pulse width modulation control being a control of generating a first pulse width modulation signal for the plurality of switching elements by a comparison of modulated waves of voltage commands in phases based on a torque command for the motor with a carrier voltage, and performing switching of the plurality of switching elements,
the second pulse width modulation control being a control of generating a second pulse width modulation signal for the plurality of switching elements based on a modulation factor of a voltage and a voltage phase based on the torque command and the number of pulses per unit period of an electrical angle of the motor, and performing switching of the plurality of switching elements; and
switching, by the electronic control unit, the plurality of switching elements between the first pulse width modulation control and the second pulse width modulation control at irregular time intervals, wherein
the first pulse width modulation control is a synchronous pulse width modulation control, and
the method further comprises:
switching, by the electronic control unit, the plurality of switching elements from the first pulse width modulation control to the second pulse width modulation control at a time of a zero-crossing of one of the modulated waves of the voltage commands of the phases that are used to generate the first pulse width modulation signal for the plurality of switching elements; and
switching, by the electronic control unit, the plurality of switching elements from the second pulse width modulation control to the first pulse width modulation control at a time of a zero-crossing time of one of modulated waves of virtual voltage commands of the phases corresponding to the second pulse width modulation signal for the plurality of switching elements.

* * * * *